United States Patent
Kim et al.

(10) Patent No.: US 10,873,963 B2
(45) Date of Patent: Dec. 22, 2020

(54) METHOD FOR TRANSMITTING DM-RS FOR BROADCAST DATA IN NEXT GENERATION COMMUNICATION SYSTEM AND APPARATUS THEREFOR

(71) Applicant: LG ELECTRONICS INC., Seoul (KR)

(72) Inventors: Hyungtae Kim, Seoul (KR); Jiwon Kang, Seoul (KR); Hyunsoo Ko, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,909

(22) PCT Filed: Apr. 4, 2018

(86) PCT No.: PCT/KR2018/003948
§ 371 (c)(1),
(2) Date: Jun. 21, 2018

(87) PCT Pub. No.: WO2018/186671
PCT Pub. Date: Oct. 11, 2018

(65) Prior Publication Data
US 2020/0296747 A1     Sep. 17, 2020

Related U.S. Application Data (60) Provisional application No. 62/481,678, filed on Apr. 4, 2017, provisional application No. 62/501,769, filed on May 5, 2017, provisional application No. 62/519,798, filed on Jun. 14, 2017, provisional application No. 62/524,587, filed on Jun. 25, 2017.

(51) Int. Cl.
*H04L 12/28* (2006.01)
*H04W 72/12* (2009.01)
(Continued)

(52) U.S. Cl.
CPC ....... *H04W 72/1273* (2013.01); *H04L 5/0007* (2013.01); *H04L 5/0044* (2013.01); *H04L 5/0051* (2013.01); *H04W 72/1289* (2013.01)

(58) Field of Classification Search
CPC .................... H04L 27/261; H04W 72/042
(Continued)

(56) References Cited

U.S. PATENT DOCUMENTS

| 2015/0029903 A1 | 1/2015 | Chen et al. |
| 2020/0028640 A1* | 1/2020 | Yeo ........................ H04L 5/0051 |

FOREIGN PATENT DOCUMENTS

| JP | 2016530791 | 9/2016 |
| KR | 10-1060952 B1 | 8/2011 |

(Continued)

OTHER PUBLICATIONS

CATT, "Discussion on DMRS design for DL," R1-1704561, 3GPP TSG RAN WG1 Meeting #88bis, Spokane, USA, dated Apr. 3-7, 2017, 7 pages, XP051251333.

(Continued)

*Primary Examiner* — John Pezzlo
(74) *Attorney, Agent, or Firm* — Fish & Richardson P.C.

(57) ABSTRACT

A method for receiving a downlink signal by a user equipment (UE) from an eNB in a wireless communication system is disclosed. In detail, the method comprises the steps of receiving a downlink control channel from the eNB; and receiving a downlink data channel and a front loaded reference signal for demodulation of the downlink data channel by using control information included in the downlink control channel, wherein the front loaded reference signal has a repetition factor of 2 on a single symbol of an antenna port of a minimum index when the downlink control channel is masked with a specific identifier.

12 Claims, 9 Drawing Sheets

(51) Int. Cl.
*H04L 5/00* (2006.01)
*H04J 1/16* (2006.01)

(58) Field of Classification Search
USPC .......................................... 370/252, 329, 503
See application file for complete search history.

(56) References Cited

FOREIGN PATENT DOCUMENTS

| KR | 10-2012-0099374 A | 9/2012 |
| KR | 10-2013-0092467 A | 8/2013 |
| KR | 10-2015-0058175 A | 5/2015 |
| KR | 10-1632208 B1 | 6/2016 |
| WO | WO 2017/018758 A1 | 2/2017 |

OTHER PUBLICATIONS

Extended European Search Report in European Application No. 18781461.1, dated Jan. 17, 2020, 10 pages.

Xinwei, "Discussion on DMRS Design and Evaluation Results," R1-1702024, 3GPP TSG-RAN WG1 NR Ad Hoc, Athens, Greece, dated Feb. 13-17, 2017, 8 pages, XP051209186.

LG Electronics, "DL DMRS Design," R1-1702461, 3GPP TSG RAN WG1 Meeting #88, Athens, Greece, Feb. 13-17, 2017, 9 pages.

Qualcomm Incorporated, "Discussion on DL DMRS design", R1-1702616, 3GPP TSG RAN WG1 Meeting #88, Athens, Greece, Feb. 13-17, 2017, 9 pages.

ZTE et al, "Discussion on downlink DMRS design", R1-1704411, 3GPP TSG RAN WG1 Meeting #88bis, Spokane, USA, Apr. 3-7, 2017, 11 pages.

LG Electronics, "Summary of [87-28] email discussion on DMRS design for DL data channel," R1-1700479, 3GPP TSG RAN WG1 NR Ad-Hoc Meeting, Spokane, USA, Jan. 16-20, 2017, 15 pages.

Qualcomm Incorporated, Discussion on DL DMRS design, R1-1700806, 3GPP TSG-RAN WG1 NR Ad-Hoc, Spokane, Washington, USA, Jan. 16-20, 2017, 6 pages.

Japanese Office Action in Japanese Application No. 2019-524920, dated Jun. 23, 2020, 6 pages (with English translation).

* cited by examiner

(A) CONTROL-PLANE PROTOCOL STACK (B) USER-PLANE PROTOCOL STACK

METHOD FOR TRANSMITTING DM-RS FOR BROADCAST DATA IN NEXT GENERATION COMMUNICATION SYSTEM AND APPARATUS THEREFOR

CROSS REFERENCE TO RELATED APPLICATIONS

This application is the National Phase of PCT International Application No. PCT/KR2018/003948, filed on Apr. 4, 2018, which claims priority under 35 U.S.C. 119(e) to U.S. Provisional Application No. 62/481,678, filed on Apr. 4, 2017, U.S. Provisional Application No. 62/501,769, filed on May 5, 2017, U.S. Provisional Application No. 62/519,798, filed on Jun. 14, 2017, and U.S. Provisional Application No. 62/524,587, filed on Jun. 25, 2017, all of which are hereby expressly incorporated by reference into the present application.

TECHNICAL FIELD

The present invention relates to a wireless communication system, and more particularly, to a method for transmitting a demodulation reference signal (DM-RS) for broadcast data in a next generation communication system and an apparatus therefor.

BACKGROUND ART

As an example of a wireless communication system to which the present invention is applicable, a 3rd Generation Partnership Project (3GPP) Long Term Evolution (LTE) communication system will be schematically described.

Figure 1:
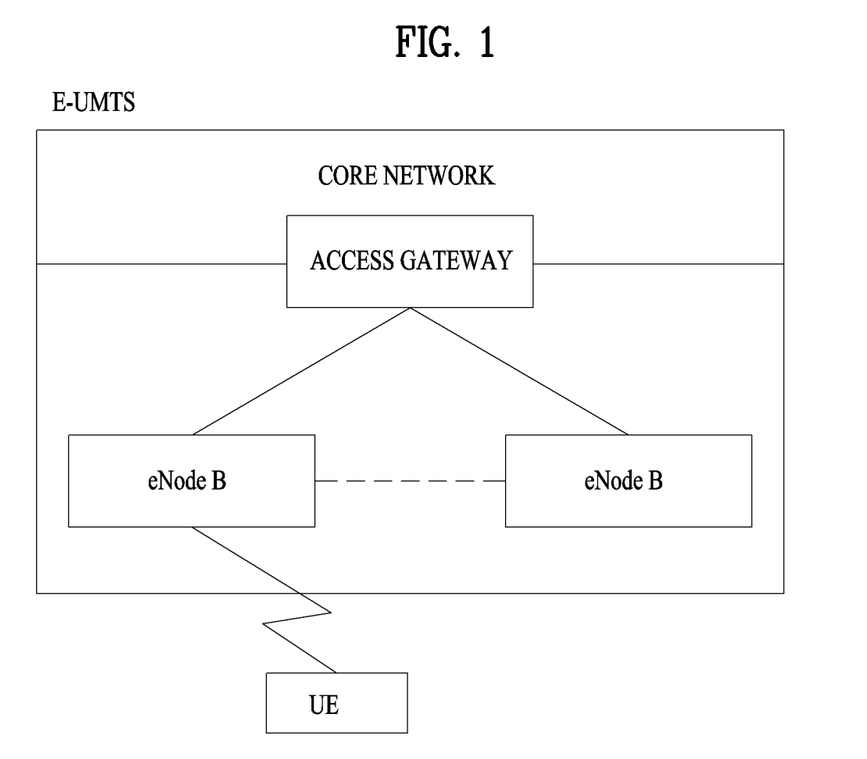
FIG. 1 is a diagram schematically illustrating a network structure of an evolved universal mobile telecommunications system (E-UMTS) as an exemplary radio communication system.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

Based on the aforementioned discussion, an object of the present invention is to provide a method for transmitting a demodulation reference signal (DM-RS) for broadcast data in a next generation communication system and an apparatus therefor.

Technical Solution

According to one aspect of the present invention, a method for receiving a downlink signal by a user equipment (UE) from an eNB in a wireless communication system comprises the steps of receiving a downlink control channel from the eNB; and receiving a downlink data channel and a front loaded reference signal for demodulation of the downlink data channel by using control information included in the downlink control channel, wherein the front loaded reference signal has a repetition factor of 2 on a single symbol of an antenna port of a minimum index when the downlink control channel is masked with a specific identifier.

Meanwhile, according to one aspect of the present invention, a method for transmitting a downlink signal from an eNB to a user equipment (UE) in a wireless communication system comprises the steps of transmitting a downlink control channel to the UE; and transmitting a downlink data channel corresponding to the downlink control channel and a front loaded reference signal for demodulation of the downlink data channel to the UE, wherein the front loaded reference signal has a repetition factor of 2 on a single symbol of an antenna port of a minimum index when the downlink control channel is masked with a specific identifier.

Also, a user equipment (UE) in a wireless communication system comprises a wireless communication module; and a processor connected with the wireless communication module, receiving a downlink control channel from the eNB, and receiving a downlink data channel and a front loaded reference signal for demodulation of the downlink data channel by using control information included in the downlink control channel, wherein the front loaded reference signal has a repetition factor of 2 on a single symbol of an antenna port of a minimum index when the downlink control channel is masked with a specific identifier.

Preferably, the specific identifier indicates that the downlink data channel is a broadcast data channel.

Preferably, whether additional reference signal added to the front loaded reference signal is received determined based on the number of symbols to which the downlink data channel is allocated. Particularly, the number of additional reference signals added to the front loaded reference signal is fixed depending on the number of symbols to which the downlink data channel is allocated.

In the embodiment of the present invention, the downlink control channel does not include information on the additional reference signal and the front loaded reference signal.

Advantageous Effects

According to the embodiment of the present invention, a DM-RS for broadcast data may efficiently be transmitted in a next generation communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition.

In the present disclosure, a base station (eNB) may be used as a broad meaning including a remote radio head (RRH), an eNB, a transmission point (TP), a reception point (RP), a relay, etc.

Figure 2:
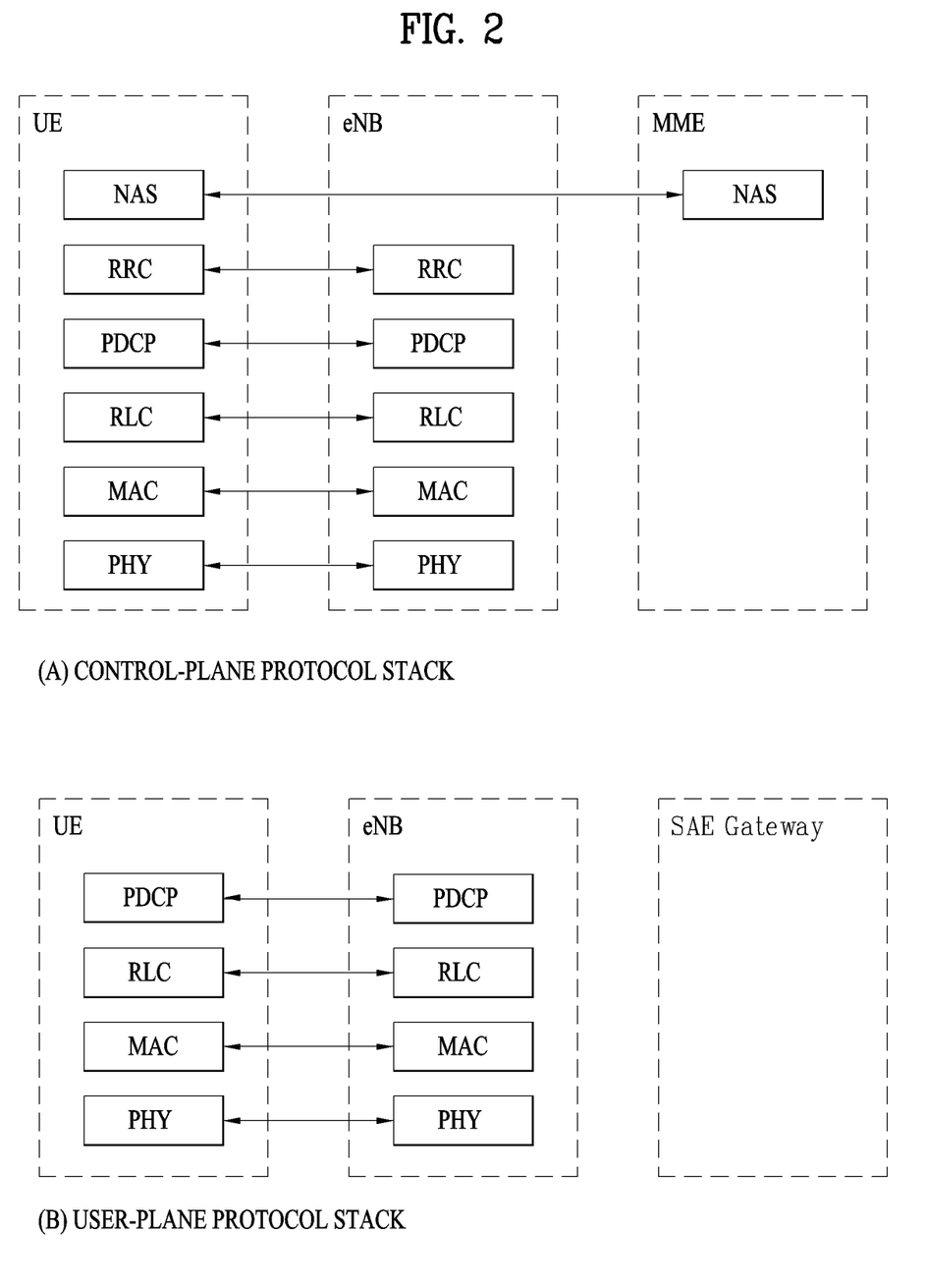
FIG. 2 is a diagram illustrating structures of a control plane and a user plane of a radio interface protocol between a UE and an evolved UMTS terrestrial radio access network (E-UTRAN) based on the 3GPP radio access network specification.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
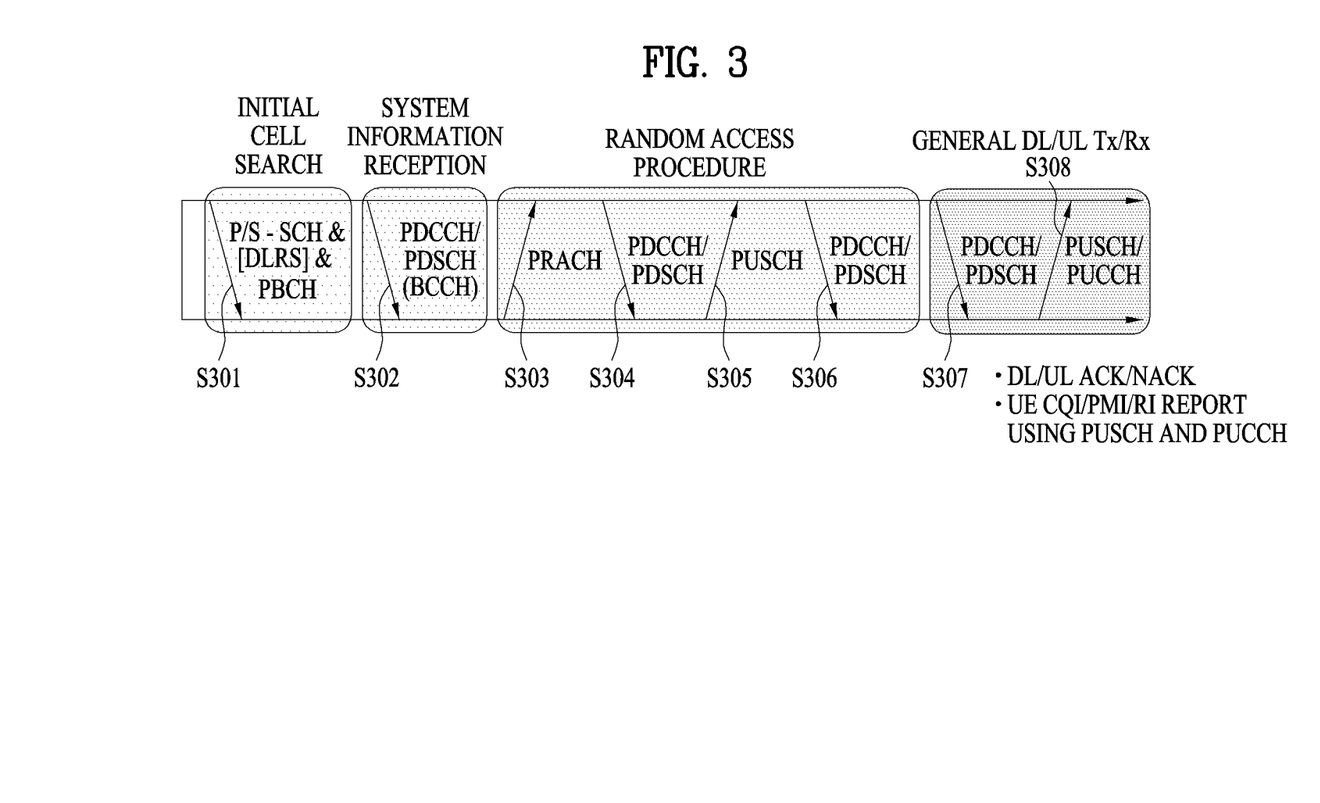
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
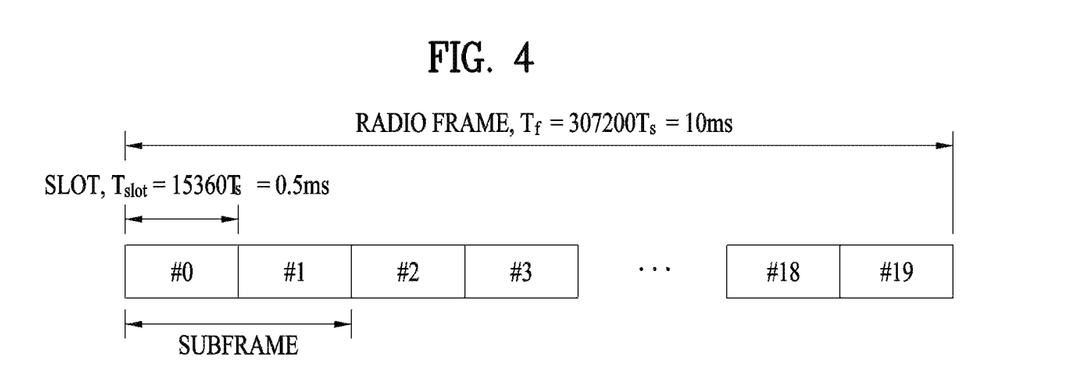
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
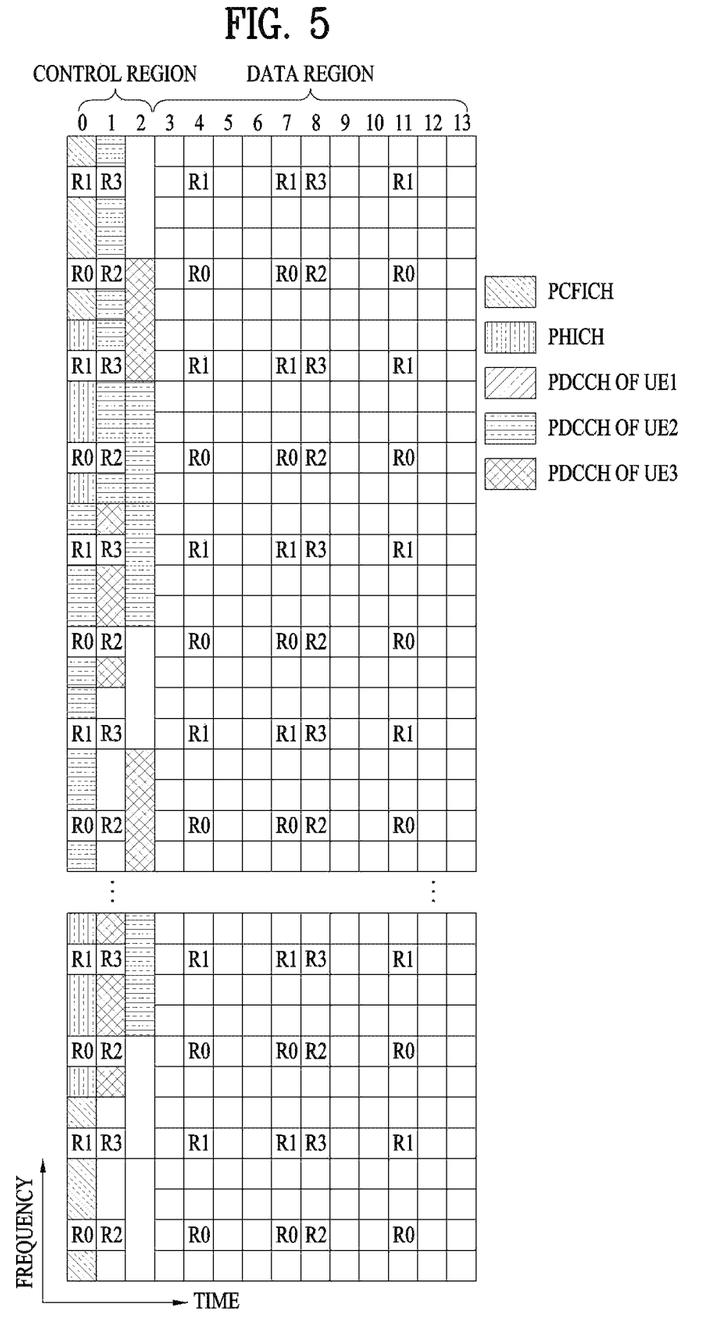
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
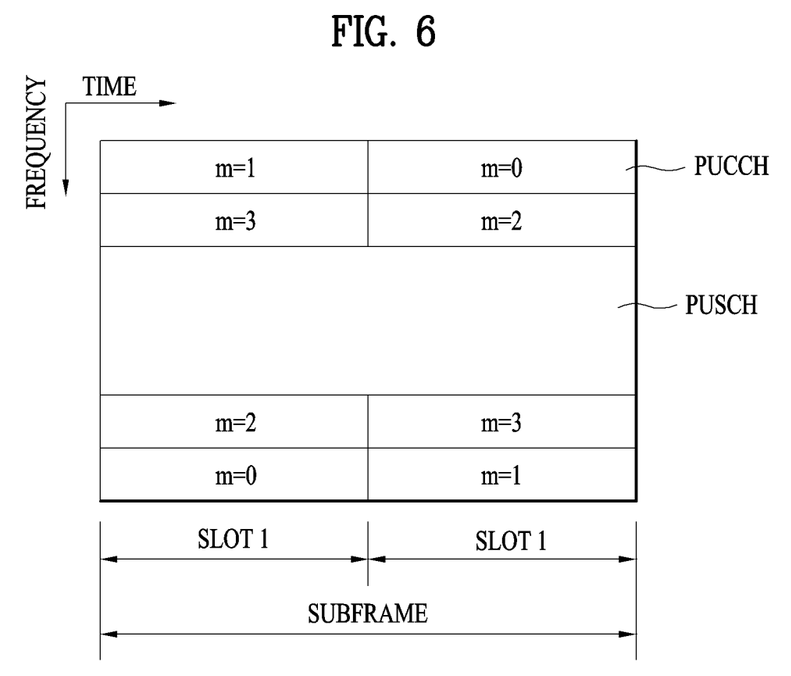
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
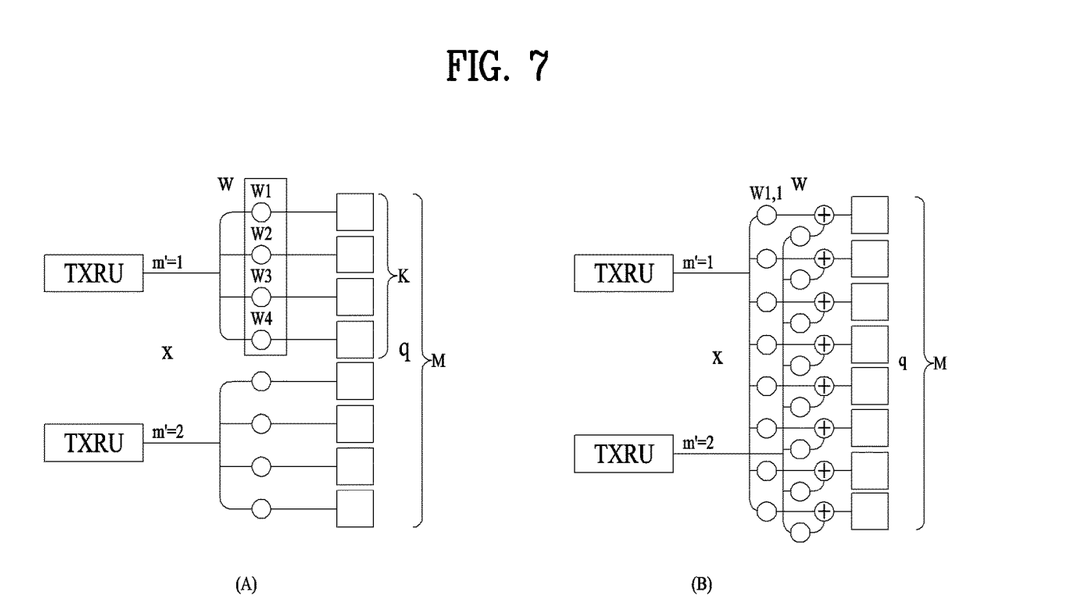
FIG. 7 is a diagram illustrating examples of a connection scheme between TXRUs and antenna elements.

FIG. 7 illustrates examples of a connection scheme between TXRUs and antenna elements.

(A) of FIG. 7 illustrates that TXRU is connected to a sub-array. In this case, the antenna elements are connected to only one TXRU. Unlike (A) of FIG. 7, (B) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
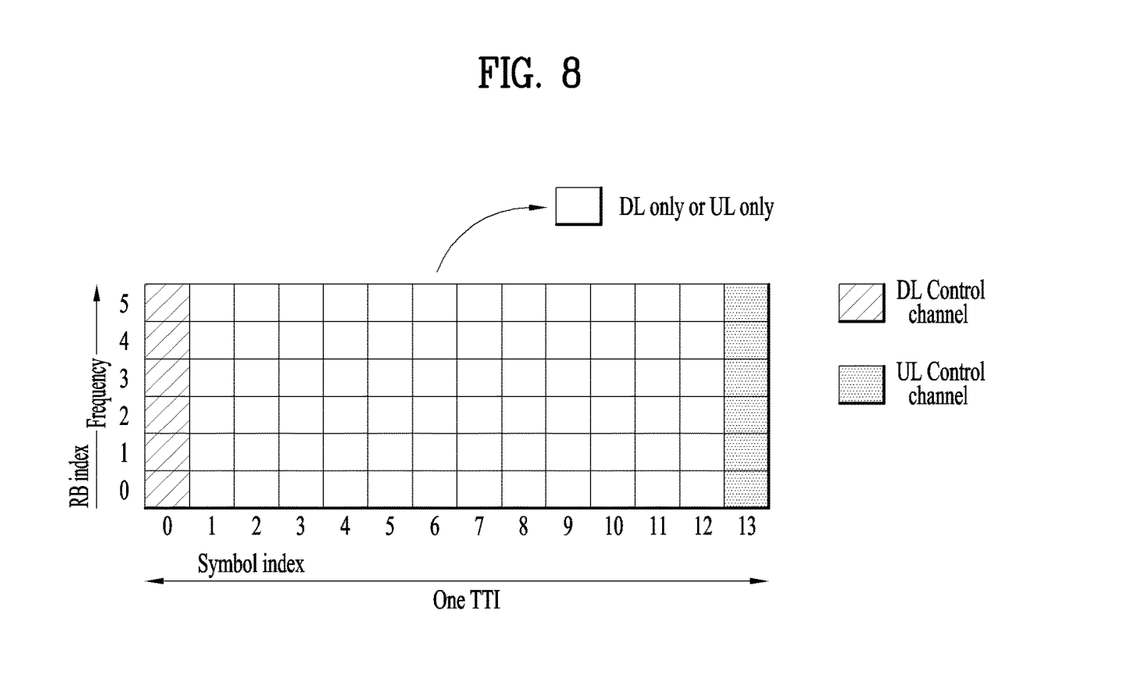
FIG. 8 is a diagram illustrating an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period (GP).

Examples of the self-contained subframe type that may be configured in the system operating based on the NewRAT may consider four subframe types as follows.

downlink control period+downlink data period+GP+uplink control period
    downlink control period+downlink data period
    downlink control period+GP+uplink data period+uplink control period
    downlink control period+GP+uplink data period Meanwhile, a plurality of unspecified UEs receive the same PDSCH with respect to broadcast PDSCH or multicast PDSCH. For example, a paging signal or SIB (system information block) corresponds to the same PDSCH. Since the PDSCH is the one received by the plurality of unspecified UEs, a random one of the UEs may be moving at fast speed, or may be located at a cell edge to have a low SINR status. For reference, the broadcast PDSCH means SI-RNTI not C-RNTI or PDSCH scrambled with paging-RNTI (P-RNTI).

Also, a structure that a DM-RS is transmitted from a front OFDM symbol of a slot is reflected in the current NR system. This will be referred to as a slot front allocation (front loaded DM-RS only structure). Also, a case that a DM-RS is transmitted to a front OFDM symbol of a slot and additionally transmitted even from a rear OFDM symbol of the slot is also implemented. That is, additional DM-RS is added in the front loaded DM-RS only structure.

In this case, to make sure that the UE which does not have a good communication environment receives broadcast PDSCH, it may be preferable that the eNB always transmits front loaded DM-RS and additional DM-RS. Also, information is transmitted using rank 1 transmission scheme 2 (that is, diversity based transmission scheme) such that the UE which does not have a good communication environment may receive information by using the most reliable transmission scheme, and to receive the information, it is preferable that the UE estimates a channel by using a DM-RS used for the rank 1 transmission scheme 2. If the broadcast PDSCH is transmitted through a single DM-RS port by using the rank 1 transmission scheme 2, the corresponding DM-RS port may be used by being fixed to an antenna port of the lowest index among DM-RS ports. If two DM-RS ports not the single DM-RS port are used, the corresponding DM-RS port may be used by being fixed to two ports of the lowest index among the DM-RS ports.

Meanwhile, the NR system supports various slot sizes. For example, various configurations such as one slot which includes 14 OFDM symbols (OS) or 7 OS and a mini slot which includes symbols (for example, 3 OS) smaller than 7 OS) exist. Particularly, if broadcast information (for example, paging signal) is transmitted to a mini slot, since a size of the slot is small, it is not preferable that additional DM-RS is used. Therefore, in this case, front loaded DM-RS may only be used, more preferably only one slot may be used for front loaded DM-RS transmission.

Even in the case that the slot includes 7 OS, it is preferable to restrict that the front loaded DM-RS is only transmitted. However, considering that very high Doppler effect exists or SINR is very low, it may be preferable that the eNB configures the number of DM-RS symbols even in the case that the slot includes 7 OS. For example, the front loaded DM-RS may be used, and either 1 symbol DM-RS or 2 symbol DM-RS may be selected and additional DM-RS is not used. Alternatively, flexible management for various statuses may be ensured by signaling the presence as to use of additional DM-RS symbol. It is preferable to use both the front loaded DM-RS and additional DM-RS in the case that the slot includes 14 OS.

Hereinafter, a respective restriction is suggested to be applied to the number of additional DM-RS symbols depending on the number of OS constituting the slot. In detail, minimum L1, M1 and N1 to maximum L2, M2 and N2 additional DM-RS symbols may be configured for each of mini slot, 7 OS slot and 14 OS slot. For example, L1=0, M1=0, N1=2, L2=0, M2=1, and N2=4 may be configured, and the eNB may indicate, to the UE, the number of additional DM-RSs within the above range in accordance with the aforementioned slot type. This may be applied to DMRS configurations for broadcast PDSCH transmission and unicast PDSCH transmission. Alternatively, in case of broadcast PDSCH, the number of additional DM-RSs may always be fixed to L2, M2 and N2 depending on the slot type.

Additionally, a respective restriction is suggested to be applied to the number of front loaded DM-RS symbols depending on the slot type. In detail, maximum L2, M2 and N2 front loaded DM-RS symbols may be configured for each of mini slot, 7 OS slot and 14 OS slot. For example, L2=0, M2=1, and N2=1 may be configured, and the eNB may indicate, to the UE, the number of front loaded DM-RS OS within the above range in accordance with the aforementioned slot type. This may be applied to DMRS configurations for broadcast PDSCH transmission and unicast PDSCH transmission. Alternatively, in case of broadcast PDSCH, the number of front loaded DM-RS OS may always be fixed to L2, M2 and N2 depending on the slot type.

Whether to use only the front loaded DM-RS, whether to use the front loaded DM-RS and additional DM-RS, or how many DM-symbols will be used (or whether to increase DM-RS density) may be varied depending on communication scenarios. For example, since a speed of the UE is not fast in a small cell environment between indoor hot spots, the front loaded DM-RS is only used, and it is preferable to use additional DM-RS together with the loaded DM-RS in a large cell.

In this specification, DM-RS configuration may be defined in various forms as to whether to use only the front loaded DM-RS, whether to use the front loaded DM-RS and additional DM-RS, or how many DM-symbols will be used (or whether to increase DM-RS density), the number of additional DM-RSs, DM-RS RE pattern, DM-RS comb value (that is, RPF (repetition factor)), and the number of OS of the front loaded DM-RS.

To support DM-RS configuration for broadcast PDSCH as above, it is preferable to notify PBCH or PDCCH of DM-RS configuration information on broadcast PDSCH. At this time, separately from DM-RS configuration for unicast PDSCH (that is, PDSCH scrambled with C-RNTI), DM-RS configuration information for broadcast PDSCH should be identified and indicated.

Meanwhile, if DM-RS configuration information for broadcast PDSCH is notified through PDCCH, DCI should be designed considering the followings.

First of all, in case of unicast PDSCH, various kinds of DM-RS information should be signaled considering channel characteristics and environment such as time variability of a channel, moving speed and Doppler size of each UE. In detail, the number of additional DM-RSs, various kinds of port information for rank and MU-MIMO transmission, nSCID, etc. should be delivered, and as a result, DM-RS signaling overhead within DCI is great.

By contrast, in case of broadcast PDSCH, rank is limited to N or less (for example, N=1) considering an edge UE, and DM-RS information to be delivered to DCI is relatively small as SU-MIMO transmission is only supported, whereby it is preferable to design a compact DM-RS field. For example, nSCID=0, rank=1, a port is fixed to an antenna port of the lowest index, and OCC length and RPF, which means a comb value corresponding to FDM between DM-RSs, are fixed to specific values, whereby this information is not delivered to DCI. Alternatively, DM-RS configuration for broadcast PDSCH and DM-RS configuration for unicast PDSCH may be defined within their respective ranges different from each other. For example, if K DM-RS RE patterns and L RPF values are supported in the NR system, the eNB for unicast PDSCH indicates, to the UE, one of K DM-RS patterns and RPF values, whereas DM-RS information on broadcast PDSCH may be used in such a manner that one of specific subset values is indicated to the UE, or may be used to be always fixed to a specific value. For example, DM-RS of broadcast PDSCH is transmitted by being always fixed to a specific value of a total of K DM-RS RE patterns and L RPF values. Alternatively, one of specially restricted P DM-RS RE patterns (K>P) and Q RFP values (L>Q) may be indicated.

Since DCI for broadcast PDSCH is CRC masked using RA (Random access)-RNTI, P-RNTI, and SI-RNTI, the UE may identify DCI of the broadcast PDSCH if CRC check of DCI is successfully performed using the above RNTI not UE-RNTI/C-RNTI. In this specification, this will be referred to as B-DCI. DM-RS configuration information on the broadcast PDSCH may be delivered through B-DCI. By contrast, DM-RS configuration information on the unicast PDSCH may be defined separately from the DM-RS configuration information on the broadcast PDSCH, and may be delivered to the UE through normal DCI (CRC masked with C-RNTI/UE-RNTIf) not B-DCI.

Among the DM-RS configuration information on the unicast PDSCH, whether to use the front loaded DM-RS only, whether to use the front loaded DM-RS and additional DM-RS, how many DM-RS symbols will be used (or whether to increase DM-RS density), the number of additional DM-RSs, DM-RS RE pattern, the number of DM-RS combs (that is, RPF (repetition factor)), etc. are delivered semi-statically through higher layer signaling (for example, RRC/MAC). It is not preferable to indicate the above information as DCI due to too great control channel overhead. Also, since the channel characteristics and network environment of the UE, which affect the above information, are not dynamically changed, the need of dynamic delivery is reduced. Among the DM-RS configuration information, port index, rank, nSCID, OCC length, the number (1 or 2) of front loaded DM-RS symbols, whether the front loaded DM-RS symbol is repeated, and whether CDM is applied to a time domain of the front loaded DM-RS symbol, which are needed to be dynamically changed, are still indicated through normal DCI.

By contrast, since information such as SIB and paging should be received by the UE before the UE is RRC connected, it is suggested that DM-RS configuration information for the broadcast PDSCH is not delivered through higher layer signaling but delivered through SIB of PBCH or B-DCI. That is, among DM-RS configuration information on the broadcast PDSCH, whether to use the front loaded DM-RS only, whether to use the front loaded DM-RS and additional DM-RS, how many DM-RS symbols will be used, the number of additional DM-RSs, DM-RS RE pattern, the number of DM-RS combs, the number (1 or 2) of front loaded DM-RS symbols, whether the front loaded DM-RS symbol is repeated, and whether CDM is applied to a time domain of the front loaded DM-RS symbol are delivered through B-DCI and/or PBCH SIB, and the other DM-RS information always use a specific fixed value.

Also, since DM-RS configuration for the broadcast PDSCH is little required to be dynamically changed, the DM-RS configuration may be restricted to be indicated semi-statically through SIB of PBCH without being indicated through PDCCH. DM-RS configuration indication through PDCCH is restrictively applied to unicast transmission. For example, DM-RS configuration used for SIB reception of PDSCH is indicated through SIB/RMSI/MIB of PBCH. Also, DM-RS configuration used for paging reception of PDSCH is indicated.

Alternatively, DM-RS configuration used for paging reception of PDSCH may be indicated through SIB of PDSCH. That is, DM-RS configuration used for SIB reception of PDSCH is indicated through SIB of PBCH, and DM-RS configuration used for paging reception of PDSCH is indicated through SIB of PDSCH. As a result, DM-RS configuration may be indicated for paging more frequently.

Additionally, a respective range of scheduling information may be configured for each of the broadcast PDSCH and the unicast PDSCH, whereby control information overhead for decoding of the broadcast PDSCH may be reduced. For example, the broadcast PDSCH may be fixed to a low modulation order considering a UE of a low SNR, or the range is indicated to be limited to relatively low modulation orders. For example, since 256 QAM or more is not suitable for the broadcast PDSCH, 256 QAM or more is not indicated to control information. As a result, control information overhead for modulation order may be reduced.

Meanwhile, DM-RS configuration types 1 and 2 are defined in the recent NR system. The DM-RS configuration type 1 is multiplexed into comb 2 (that is, RPF=2), and the DM-RS configuration type 2 is multiplexed into comb 3 (that is, RPF=3). Also, OCC is applied to each type, whereby 2 ports may be allocated to each symbol. In this case, comb 2 means that two DM-RS sequences are multiplexed into a frequency axis in a unit of 2 REs, and comb 3 means that two DM-RS sequences are multiplexed into a frequency axis in a unit of 3 REs.

In this case, as the broadcast PDSCH is limited to low-rank transmission such as rank 1, it is not required to define many DM-RS ports. Therefore, DM-RS of the broadcast PDSCH is limited to DM-RS configuration 1. Alternatively, DM-RS of the broadcast PDSCH is limited to 1 symbol front loaded DM-RS of DM-RS configuration 2 having less DM-RS ports.

Also, it is not required to use 2 symbol front loaded DM-RS for the same reason. Therefore, the broadcast PDSCH is transmitted to one front loaded DM-RS symbol, and the presence of additional DM-RS OS, the number of OS and location of the OS may be configured additionally, or additional DM-RS is always transmitted to the fixed number of OS and the fixed OS location. At this time, the front loaded DM-RS and additional DM-RS have the same pattern. (That is, the front loaded DM-RS and additional DM-RS have the same RPF value and the same CS, and the same DM-RS RE density is provided in each DM-RS OS.

Alternatively, for more flexible scheduling, the eNB may configure, to the UE, which pattern is used if front loaded DM-RS symbol and additional DM-RS symbol are transmitted together for broadcast PDSCH transmission. This may be defined in SIB within PDSCH, B-DCI within PDCCH, or SIB within PDSCH. Alternatively, front loaded DM-RS configuration type 1 or 2 which will be used for the broadcast PDSCH may be configured for the UE by the eNB. This may be defined SIB within PBCH, B-DCI within PDCCH, or SIB within PDSCH.

It is preferable that the UE receives a DM-RS in a fixed DM-RS pattern with respect to the broadcast/multicast PDSCH before RRC connection is established. This is because that PBCH should be used to deliver DM-RS pattern information to the UE before RRC connection. In detail, since PBCH does not have sufficient control information capacity and is preferably used for other important control information, the eNB and the UE use a fixed DM-RS pattern before RRC connection. DM-RS configuration may be delivered through DCI masked with SI RNTI, P RNTI, or RA RNTI after RRC connection. Main examples of the broadcast/multicast PDSCH transmitted before RRC connection include RAR and SIB, and main examples of the broadcast/multicast PDSCH transmitted after RRC connection include paging and SIB.

Additionally, since RAR (random access response) is PDSCH multicast to multiple UEs which have transmitted message 1, DM-RS configuration may be determined for RAR in the same manner as SIB-PDSCH or paging. Also, DM-RS configuration information of RAR may be included in DCI masked with RA RNTI and then delivered to the UE.

Figure 9:
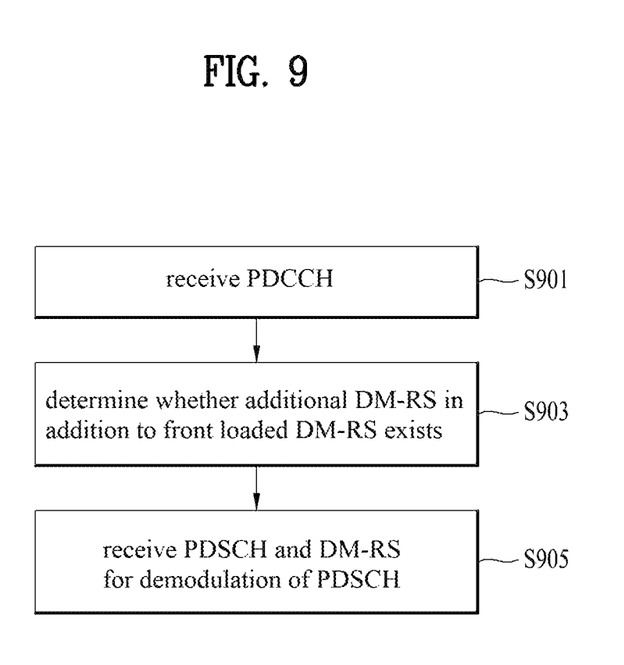
FIG. 9 is a flow chart illustrating a method for receiving broadcast PDSCH in a UE of an NR system in accordance with the embodiment of the present invention.

FIG. 9 is a flow chart illustrating a method for receiving broadcast PDSCH in a UE of an NR system in accordance with the embodiment of the present invention.

Referring to FIG. 9, in step 901, the UE receives a downlink control channel, that is, PDCCH from the eNB. In this case, it is assumed that PDCCH is scrambled with SI-RNTI or P (paging)-RNTI not C-RNTI.

In step 903, the UE determines whether additional DM-RS in addition to front loaded DM-RS for demodulation of PDSCH exists. In detail, the UE may determine whether additional DM-RS added to the front loaded DM-RS is received, on the basis of the number of symbols allocated to the PDSCH. The number of symbols of the additional DM-RS is fixed in accordance with the number of symbols to which the PDSCH is allocated. As a result, according to the present invention, PDCCH is transmitted and received using a fixed parameter without including information on front loaded DM-RS and additional DM-RS. Also, it is preferable that the front loaded DM-RS has a repetition factor of 2, that is, DM-RS configuration type 1 on a single symbol on an antenna port of a minimum index if the downlink control channel is masked with a specific identifier. This is intended to make sure of reliability because stable information transfer should be performed for the UE located at the cell edge in view of characteristics of broadcast information.

Finally, in step 905, the UE receives PDSCH scheduled by the PDCCH and front loaded DM-RS for demodulation of the PDSCH. Also, in accordance with the result of step 903, the UE may receive additional DM-RS for demodulation of the PDSCH together with the front loaded DM-RS. Likewise, it is assumed that the PDSCH is scrambled with SI-RNTI or P-RNTI not C-RNTI. In this case, the PDSCH means PDSCH of a broadcast/multicast mode not a unicast mode.

Figure 10:
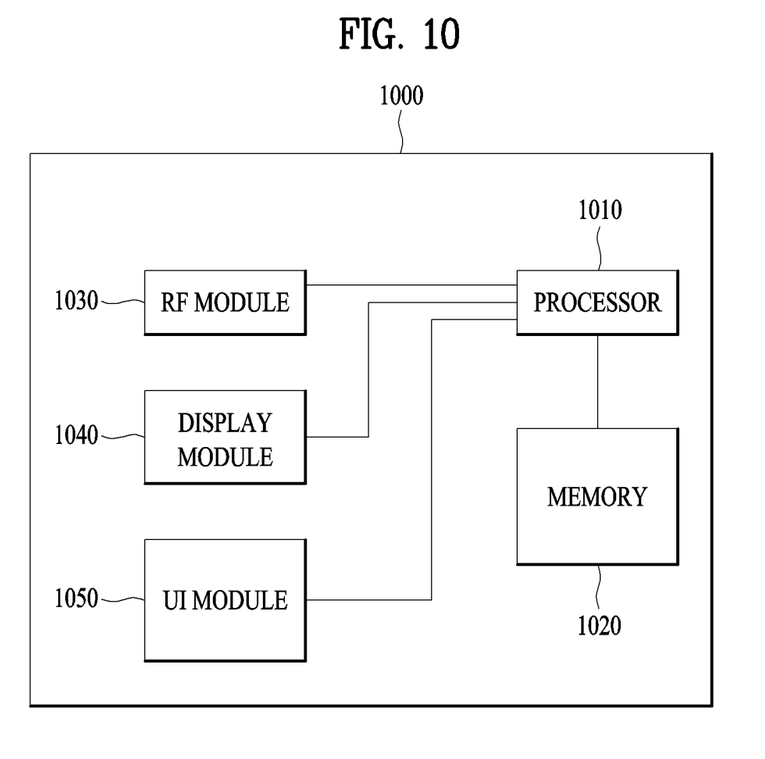
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with respect to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency up-conversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the method for mapping a codeword and a layer in a next generation communication system and the apparatus therefor have been described based on the 3GPP LTE system, the method and the apparatus are applicable to various wireless communication systems in addition to the 3GPP LTE system.

The invention claimed is:

1. A method for receiving a downlink signal by a user equipment (UE) from an eNB in a wireless communication system, the method comprising:
   receiving a downlink control channel from the eNB; and
   receiving a downlink data channel and a front loaded reference signal for demodulation of the downlink data channel by using control information included in the downlink control channel,
   wherein the front loaded reference signal has a repetition factor of 2 on a single symbol of an antenna port of a minimum index,
   wherein the downlink control channel is masked with an identifier indicating that the downlink data channel is a broadcast data channel.

2. The method according to claim 1, wherein whether an additional reference signal added to the front loaded reference signal is received or not is determined based on the number of symbols to which the downlink data channel is allocated.

3. The method according to claim 2, wherein a number of symbols of the additional reference signals added to the front loaded reference signal is fixed depending on a number of symbols to which the downlink data channel is allocated.

4. The method according to claim 2, wherein the downlink control channel does not include information on the additional reference signal and the front loaded reference signal.

5. A method for transmitting a downlink signal from an eNB to a user equipment (UE) in a wireless communication system, the method comprising:
   transmitting a downlink control channel to the UE; and
   transmitting a downlink data channel corresponding to the downlink control channel and a front loaded reference signal for demodulation of the downlink data channel to the UE,
   wherein the front loaded reference signal has a repetition factor of 2 on a single symbol of an antenna port of a minimum index,
   wherein the downlink control channel is masked with an identifier indicating that the downlink data channel is a broadcast data channel.

6. The method according to claim 5, wherein whether an additional reference signal added to the front loaded reference signal is received or not is determined based on the number of symbols to which the downlink data channel is allocated.

7. The method according to claim 6, wherein a number of symbols of the additional reference signals added to the front loaded reference signal is fixed depending on a number of symbols to which the downlink data channel is allocated.

8. The method according to claim 6, wherein the downlink control channel does not include information on the additional reference signal and the front loaded reference signal.

9. A user equipment (UE) in a wireless communication system, the UE comprising:
   a wireless communication module; and
   a processor connected with the wireless communication module, receiving a downlink control channel from the eNB, and receiving a downlink data channel and a front loaded reference signal for demodulation of the downlink data channel by using control information included in the downlink control channel,
   wherein the front loaded reference signal has a repetition factor of 2 on a single symbol of an antenna port of a minimum index,
   wherein the downlink control channel is masked with an identifier indicating that the downlink data channel is a broadcast data channel.

10. The UE according to claim 9, wherein whether an additional reference signal added to the front loaded reference signal is received or not is determined based on the number of symbols to which the downlink data channel is allocated.

11. The UE according to claim 10, wherein a number of symbols of the additional reference signals added to the front loaded reference signal is fixed depending on a number of symbols to which the downlink data channel is allocated.

12. The UE according to claim 10, wherein the downlink control channel does not include information on the additional reference signal and the front loaded reference signal.

* * * * *